April 21, 1964 W. C. PRIOR 3,129,597

PULLEYS

Filed Feb. 16, 1962 2 Sheets-Sheet 1

INVENTOR.
WILLIAM C. PRIOR

BY Watts & Fisher

ATTORNEYS.

April 21, 1964 W. C. PRIOR 3,129,597

PULLEYS

Filed Feb. 16, 1962 2 Sheets-Sheet 2

INVENTOR.
WILLIAM C. PRIOR

BY Watts & Fisher

ATTORNEYS.

United States Patent Office 3,129,597
Patented Apr. 21, 1964

3,129,597
PULLEYS

William C. Prior, Chagrin Falls, Ohio, assignor to Speed Selector, Inc.

Filed Feb. 16, 1962, Ser. No. 173,625
15 Claims. (Cl. 74—230.17)

This invention relates generally to pulleys, and more specifically to spring-loaded, variable pitch pulleys and to a novel disc spring assembly for effecting controlled loading and movement of the pulley halves.

Disc springs, and particularly cone disc springs, have been known and used for many years because of their unique features of being compact, light, self-damping, and of providing high load capacity within a small range of deflection. Another important and recognized characteristic is that, by changing the proportions of disc springs, they can be adapted to a wide range of load-deflection spring curves. For example, disc springs can be formed to produce either progressive, regressive or substantially constant loading through their deflection ranges.

In spite of the potential advantages offered by disc springs, their practical application heretofore has been limited. The primary reason for this is that the characteristics described above are often found to be incompatible; that is, while certain features may be advantageous in a given application, other features will be a distinct disadvantage.

For example, because of size and load requirements, it may be impossible to design a disc spring to provide the desired deflection or range of movement. Similarly, if a disc spring is designed to a selected load-deflection curve, the resulting amplitude of deflection and the spring pressure may be unacceptable.

One conventional construction for multiplying the deflection of a cone disc spring contemplates the formation of integral fingers that radially extend from the disc spring. This construction has several inhert disadvantages. Since the fingers are formed integral with the disc spring, the fingers are segments of a cone and thus of arcuate cross-section. As the cone disc spring is deflected through its full movement, it will tend to go first into a flat position and then to an inverted cone shape. The integral fingers, however, tend to remain with their original arcuate section. The result is that at the junction or root ends of the fingers and the cone disc spring the spring is distored into a wavy configuration. Also, as the cone disc spring is deflected through its full range, its outside diameter is concurrently stretched, and the attached fingers tend to concentrate this stretch into the areas between the fingers. This results in very high stress concentrations being created at the roots of the fingers which severely limit the overall stresses for which the disc spring can be designed. Further, the fingers themselves are subject to substantial axial deflection during the movement of the disc spring. The axial deflection of the fingers affects the load deflection characteristic of the spring and is difficult to calculate.

The difficulties heretofore encountered when attempting to utilize conventional cone disc springs in applications having fixed parameters of size, loading and amplitude of movement are exemplified by efforts to use disc springs to spring-load variable pitch pulleys. The usual variable pitch pulley construction includes a shaft on which is mounted a pair of opposed cone discs or pulley halves that drivingly engage the sides of a V-belt. The pulley halves are made relatively movable axially of the shaft for the purpose of varying the speed of the drive. When the pulley halves are relatively moved apart, the belt is drawn radially inwardly along their conical faces to decrease the effective pitch diameter of the pulley. Conversely, when the pulley halves are brought together, the V-belt is forced radially outwardly to increase the effective pitch diameter of the pulley.

As will be recognized by those familiar with the art, either one or both of the pulley halves may be spring-loaded. The pressure against the sides of the belt must be sufficient to prevent slippage and/or excessive creep. On the other hand, if the pressure is excessive, the belt will be subject to severe wear, an undue strain will be imposed on all the components of the drive, and, in general, the efficiency of the drive will be decreased.

Heretofore, the most conventional manner of loading variable pitch pulleys has been to use coil springs. Coil springs exhibit essentially straight line load deflection so that the forces exerted by the springs progressively increase with their deflection. This characteristic is usually a disadvantage in a variable pitch pulley since, in many cases, it is desirable to maintain constant pressure on the V-belt in any position of pitch adjustment. In other applications, a regressive spring force may be required.

In order to reduce the detrimental force build-up of coil springs, attempts have been made to use a very long spring and to compress the spring into a small housing so that only a small part of the total spring curve is utilized. This construction, however, does not give a completely flat spring curve as would produce uniform loading in any position of pitch adjustment. Moreover, such a spring is expensive, bulky, and difficult to assemble in the pulley. Also, the pulley tends to go out of dynamic balance when the spring is used and adjusted.

Other attempts have been made to avoid the disadvantages of coil springs by using various cam mechanisms for loading variable pitch pulleys. While cam-loaded pulleys are useful in some applications, their general utilization is limited. It is difficult to obtain a large amount of movement with the cam mechanisms of the prior art. Also, the cams have a tendency to overload the belts and produce the consequent undesirable results discussed above. In addition, these constructions are usually expensive, bulky, and subject to severe wear.

The conventional cone disc spring potentially offers a very good way of overcoming the difficulties encountered with spring and cam-loaded variable pitch pulleys, since, as noted above, the disc spring can be designed to a wide variety of load-deflection curves. However, prior to the present invention, attempts to load variable pitch pulleys with conventional cone disc springs have been unsuccessful. As will be apparent from the foregoing discussion, a variable pitch pulley of any given size requires an exact amount of relative movement between the pulley halves in order that the pitch diameter can be varied within the prescribed limits. Moreover, the spring pressure must be such that the belt will not be either overloaded or underloaded. When conventionl cone disc springs were designed to the size limitations of the pulley and to a particular load-deflection curve, and particularly a flat spring curve wherein the spring pressure remains substantially constant during deflection, it was found that the maximum deflection of the disc spring was insufficient to produce the required movement of the pulley halves. In addition, the spring pressure was excessive, thus causing the pulley to be overloaded.

Accordingly, it is an object of the invention to provide a variable pitch pulley which is loaded in such a manner as to effect controllable predetermined belt pressure in any position of pitch adjustment.

A further object of the invention is to provide a variable pitch pulley as described above which is inexpensive, compact, and easy to assemble.

Another object of the invention is to provide a spring-loaded variable pitch pulley which remains in dynamic balance during operation.

A related object of the invention is to provide a disc spring assembly which enhances the versatility of disc springs, and cone disc springs in particular, and permits their use in a wide variety of applications.

A more specific object of the invention is to provide a cone disc assembly which permits the load-deflection characteristic, the pressure, and the deflection range of cone disc springs to be relatively adjusted within wide limits.

Another object of the invention is to provide a cone disc spring assembly which has no wearing parts and which utilizes a cone disc spring formed by conventional techniques.

A further object of the invention is to provide a cone disc spring assembly which is easy to assemble and is relatively inexpensive to manufacture.

The variable pitch pulley construction contemplated by the invention includes a novel spring assembly comprising a disc spring and a plurality of separately formed lever fingers which are connected to and radially extend from the disc spring. The fingers are such that they do not affect the load-deflection characteristic of the disc spring and do not create stresses which would otherwise limit the overall stresses for which the spring can be designed. According to the preferred embodiment of the invention, the fingers also protect the disc spring from corrosive or other deleterious environments.

As will be hereinafter discussed in detail, the disc spring assembly permits the disc spring to be designed to a selected load-deflection curve. By proportioning the length of the lever fingers, the inner and outer diameters of the disc spring, and the regions, in which the disc spring is connected to the fingers, the amplitude of movement of the disc spring assembly and its effective pressure can be relatively adjusted within wide limits. Thus, the invention provides for the versatile use of disc springs and makes it possible to design disc springs for many different applications.

Another advantage is that the disc spring assembly provides good fulcrum points with substantial bearing areas. The fulcrum points themselves can be changed when adapting the assembly to given loads and pressure.

According to the preferred embodiment of the variable pitch pulley, a disc spring assembly, as generally described above, is mounted on the pulley shaft and bears against one pulley half. The disc spring assembly preferably is constructed to exert a constant pressure during deflection of the spring, although, it can be made to create either regressive or progressive loading of the pulley. In this way, a belt tension of a correct value can be maintained in any position of pitch adjustment. This characteristic feature of the invention minimizes belt wear and excessive strain on the other components of the drive. At the same time, the pressure can be made sufficient to prevent belt slippage under load and, in general, to obtain maximum drive efficiency.

The disc spring assembly can be easily assembled with the pulley to form a simple, compact construction for producing the required relative face adjustment of the pulley halves. Additional advantages which characterize the pulley of the invention are the exclusion of dirt and dust by the spring assembly, improved ventilation, and dynamic balance.

Other objects and advantages of the invention becomes apparent from the following detailed description and the accompanying drawings.

Figures 1, 2, 3, 4:
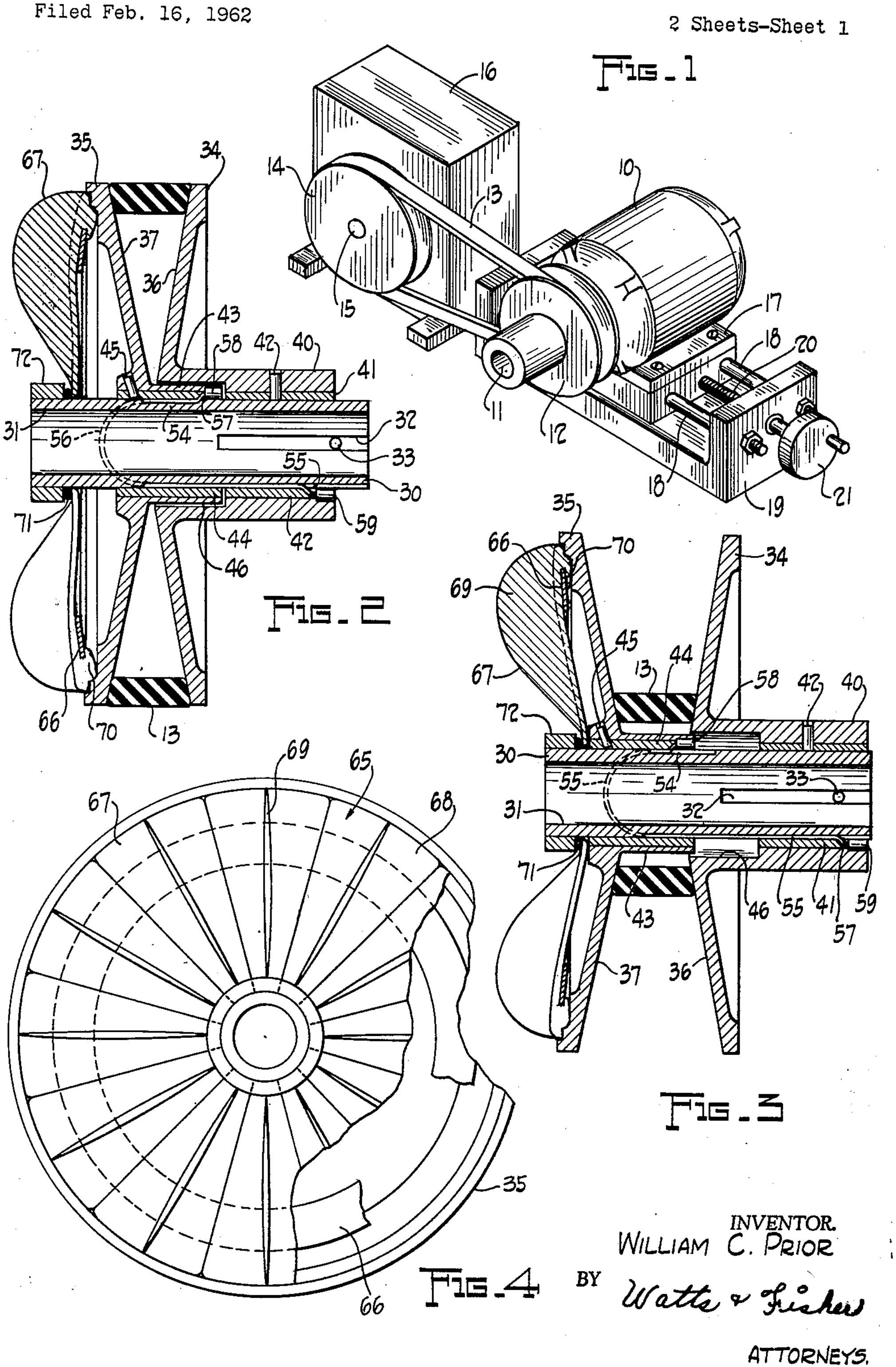
FIGURE 1 is a perspective view diagrammatically illustrating the variable pitch pulley of the invention incorporated in a typical power drive between the motor and a machine.
FIGURE 2 is a cross-sectional view showing the variable pitch pulley in one position of pitch adjustment.
FIGURE 3 is a cross-sectional view similar to FIG. 2 showing the pulley in another position of pitch adjustment.
FIGURE 4 is an end elevational view, with portions broken away, of the structure illustrated in FIG. 2.

Referring now to the drawings, and to FIG. 1 in particular, there is shown a motor 10 having a drive shaft 11 on which is mounted the variable pitch pulley 12 of the invention. The variable pitch pulley 12 is drivingly connected by a V-belt 13 to a companion pulley 14 of fixed pitch diameter. The companion pulley 14 is mounted on the input shaft 15 of a machine generally designated by reference character 16.

It will be apparent that the speed at which the input shaft 15 is driven can be varied by changing the pitch diameter ratio of the pulleys 12 and 14. With the drive connection illustrated in FIG. 1, this change in the ratio of pitch diameters is effected by varying the center distance between the shafts 11 and 15. To this end, the motor 10 is mounted on a sliding base 17. This sliding base 17 is slidably carried on guide rods 18 which are connected to a sub-base 19. A shaft 20 is threaded through the front end of the sub-base 19 into rotatable connection with the sliding base 17 and a suitable crank or wheel 21 is fixed to the free end of the threaded shaft.

As will be more fully described, when the handle 21 and shaft 20 are turned to move the sliding base toward the companion pulley 14, the V-belt will be forced radially outwardly on the pulley 12 to produce an increased effective pitch diameter of the variable pitch pulley. Thus, the shaft 15 will be driven at an increased speed. Conversely, when the sliding base 17 is moved away from the companion pulley 14, the V-belt will be drawn radially inwardly to produce a smaller effective pitch diameter and a slower speed of the shaft 15.

Reference is now made to FIGS. 2–4 which illustrate the preferred embodiment of the pulley 12. As shown, the pulley 12 includes a hollow shaft 30 adapted to be mounted on the motor drive shaft 11. The through bore 31 of the shaft 30 may be formed with a key-way 32 to receive a key (not shown) for locking the shaft 30 against relative rotation on the motor shaft. One or more set screws 33 may also be provided through the wall of the shaft 30 for adjustably locking the shaft 30 against axial movement.

A pair of opposed cone discs or pulley halves 34 and 35 are mounted on the shaft 30 for axial sliding movement. The pulley halves 34 and 35 have opposed conical surfaces 36 and 37, respectively, which drivingly engage the sides of the V-belt 13.

The pulley half 34 is shown as including a sleeve-like hub portion 40. The hub 40 includes an inner bearing sleeve 41 that is slidably engaged on the shaft 30. This inner bearing sleeve 41 is preferably a pre-lubricated-sintered alloy bushing or the like which will permit the pulley to be run for long periods of time at one speed without sticking on the shaft. A pin 42 is provided for securing the bearing sleeve or bushing 41 to the pulley half 34.

The construction of the opposed pulley half 35 is similar to the pulley 34 and includes a sleeve-like hub portion 43 which extends in the same direction as the hub 40. As shown in FIG. 2, the hub 40 is formed with an annular recess 46 for receiving the hub 43 when the pulley halves are centered on the shaft 30. The hub 43 of the pulley half 35 also includes an inner bearing sleeve or bushing 44 which is fixed to the pulley half by the pin 45.

According to the preferred embodiment of the invention, the pulley half 34 is connected to the pulley half 35 for equal and opposite sliding movement of the pulley half on the shaft 30. This equal and sliding movement of the pulley halves assures that the V-belt 13 will be maintained in driving alignment with the companion pulley 14 in any position of pitch adjustment of the pulley 12.

The preferred structure for connecting the pulley halves is shown to include a guide channel on the outer surface of the shaft 30. This guide channel has a first leg portion 54 which extends from beneath the pulley half 35 away from the pulley half 34 and a second leg portion 55 which extends from beneath the pulley half 34 toward the pulley half 35. The leg portions 54 and 55 of the guide channel are spaced circumferentially of the shaft 30 are connected by a reverse bend 56. As shown, the reverse bend 56 of the guide channel is formed in the end portion of the shaft 30 on which the pulley half 35 is slidably mounted.

A force-transmitting cable 57 is slidably disposed in the guide channel. One end of this force-transmitting cable 57 is connected to the pulley half 35 along the leg portion 54 of the guide channel. This connection may be effected by a cable-receiving ferrule 58 which is carried by the hub 43 of the pulley half 35. The opposite end of the cable 57 is connected to the pulley half 34 along the leg 55 of the guide channel by a similar ferrule 59.

In accordance with the present invention, the pulley half 35 is spring-loaded by a disc spring assembly 65 for maintaining correct belt tension and pressure engagement between the pulley halves and the sides of the V-belt during operation of the drive. The preferred construction of the disc spring assembly 65 includes a cone disc spring 66; although, the disc spring may be of other types, as, for example, an initially flat disc spring, a disc spring of tapered cross-section, a dish-shaped cone spring, or the like. As will hereinafter be described in more detail, the disc spring 66 is designed to a selected load-deflection curve, and is preferably formed so that the disc spring assembly exerts substantially constant pressure in the positions of pitch adjustment of the pulley halves.

The disc spring 66 is carried by a plurality of radially extending lever fingers 67. These lever fingers 67 include substantially flat, trianguloid body portions 68 which are disposed in side-by-side adjacency. Each lever finger further includes an axial, rearwardly extending rib 69 which is transverse to the body portion 68. The ribs 69 prevent distortion and/or breakage of the lever fingers 67 during operation of the cone disc spring assembly.

In the illustrated construction, the cone disc spring 66 is connected to the fingers 67 intermediate their ends by a lip 70 which embraces the radially outer edge of the disc spring. This connection between the disc spring 66 and fingers 67 permits relative movement between the radially inner portions of the disc spring and the fingers. Consequently, the disc spring is free to deflect through a dead flat position without distorting the fingers and without concentrating stresses in the regions of where the disc spring is connected to the fingers.

The wide outer end portions of the lever fingers provide large bearing areas that contact the pulley half 35 along a region spaced radially outwardly of the disc spring. The relatively small, inner ends of the lever fingers 67 are radially disposed about the shaft 30 and abut a resilient washer 71. The lever fingers and washer 71 are held on the shaft by a collar 72. In this manner, the pulley half 35 is urged toward the center of the shaft 30 by a constant biasing pressure.

In FIG. 2 the pulley halves are shown closely adjacent to provide the maximum pitch diameter of the pulley 12. Taking FIGS. 2 and 3 in conjunction, it will be seen that, when the center distance between the motor shaft 11 and the driven shaft 15 is increased, the pulley half 34 is forced toward one end of the pulley 30. This sliding movement of the pulley half 34 pulls the cable 57 around the reverse bend 56 of the guide channel so that the pulley half 35 is drawn toward the opposite end of the pulley shaft against the biasing pressure created by the cone disc spring assembly 65.

As the pulley half 35 is thus drawn toward the end of the pulley shaft, the fingers 67 of the cone disc spring assembly will pivot counterclockwise, as viewed in FIGS. 2 and 3, and cause the disc spring 66 to pass through a dead flat position to the position of maximum deflection illustrated in FIG. 3. As there shown, the pulley halves 34 and 35 are spaced apart and the pulley 12 is of minimum pitch diameter.

Any intermediate position of pitch adjustment can obviously be obtained by appropriately adjusting the center distance between the motor shaft and the driven shaft. When the center distance between the shafts is lessened, the disc spring will deflect toward the position illustrated in FIG. 2 to pivot the lever fingers 67 clockwise and to thereby center the pulley half 35 on the pulley shaft. At the same time, the cable 57 will be drawn around the reverse bend of the guide channel to produce equal centering movement of the pulley half 34. Since the cone disc spring 66 is preferably designed to a flat spring curve, constant loading of the pulley is maintained in every position of pitch adjustment.

Although the preferred pulley construction has been shown as including a force-transmitting cable for obtaining equal and opposite movement of both pulley halves, it is to be understood that this construction is not limiting of the invention. For example, other mechanisms could be used to effect face adjustment of the pulley. Also, the pulley half 34 could be fixed on the shaft 30 and the face adjustment effected by moving only the pulley half 35. It is to be further understood that the variable pitch is capable of being used to advantage in other drives than that illustrated. By way of example, the spring-loaded variable pitch pulley 12 can be used with a manually adjustable variable pitch pulley and the pulleys mounted directly on motor and driven shafts having a fixed center distance.

Figure 5:
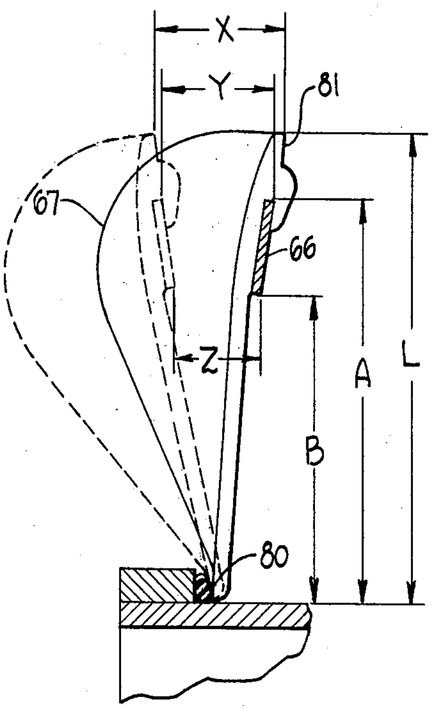
FIGURE 5 is a diagrammatical, cross-sectional view of the disc spring assembly of the invention; and, FIGURE 6 is a cross-sectional view of a cone disc spring.
Figure 6:
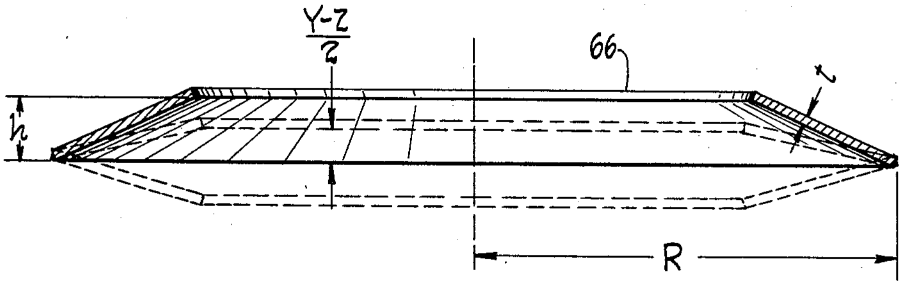

Reference is now made to FIGS. 5 and 6 which illustrate in detail the action and relationships of the elements forming the cone disc spring assembly of the invention. In FIG. 5 there is shown one of the lever fingers 67 which carry the disc spring 66 between the inner fulcrum end 80 of the lever and its opposite bearing end 81. The effective length of the lever fingers 67 in the illustrated construction of the assembly is indicated by L and the distances between the inner fulcrum end 80 of the lever and the radially outer and inner edges of the disc spring by A and B, respectively. FIGURE 5 also illustrates in phantom and solid outline the extreme positions of the lever fingers 67 produced by deflection of the disc spring 66. When the lever finger 67 is pivoted from the solid line position to the position shown in phantom outline, the bearing end 81 of the finger will move through a distance X, the radially outer edge of the disc spring through the distance Y, and the radially inner edge of the disc spring through the distance Z. It will be seen that $$\frac{X}{L}=\frac{Y}{A}=\frac{Z}{B}$$

and that $$\frac{X}{L}=\frac{Y-Z}{A-B}$$

where $Y-Z$ is the deflection of the disc spring and $A-B$ is the spring width. Therefore, the ratio $$\frac{P_{\text{spring}}}{P_{\text{assembly}}}$$

of the spring pressure to the effective pressure of the disc spring assembly equals $$\frac{L}{A-B} \text{ equals } \frac{X}{Y-Z}$$

The preferred cone shaped formation of the disc spring 66 is illustrated in FIG. 6 as having a thickness $t$, an outer radius R, and a height which is indicated by $h$. As is known to those familiar with the design of cone disc springs, the load-deflection curve is determined by the ratio $h/t$. According to the preferred embodiment of the present invention, this ratio $h/t$ is from 1.4 to 1.5, since a disc spring having a load-deflection characteristic of this magnitude can be designed to a substantially flat spring curve and can be made to exert a substantially constant pressure through a deflection of $$\frac{Y-Z}{2}$$

at each side of a dead flat position.

In any particular application there will be physical and load requirements which define the parameters of the cone disc spring and the disc spring assembly. Thus, by using the relationships described above in conjunction with standard graphs and formulas for determining spring pressure, a cone disc spring assembly can be constructed to suit the physical and load requirements of the application.

For example, in a variable pitch pulley required to be loaded under a specific pressure, $P_{\text{assembly}}$, the distance X is known and is the required movement of each pulley half. The dimension L also is known and is the radial distance between the pulley shaft and the desired bearing regions of the ends 81 of the lever fingers 67. Other factors which are known are the spring material, its modulus of elasticity and the maximum working stress permissible in the spring material. Using this information, a specific cone disc spring can be selected which will be stressed within the maximum permissible limit and which will produce the required loading and movement.

A specific example of the construction of cone disc spring assembly for use with a variable pitch pulley is as follows:

A nine inch variable pitch pulley was mounted on a 1⅝ inch pulley shaft. The pulley required a substantially constant loading of 210 pounds through the movement X of .568 inch of each pulley half, and the radial distance L was determined to be 4.375 inches. An alloy steel having a modulus of elasticity of $30\times10^6$ and a maximum working stress of 240,000 p.s.i. was selected as the spring material.

As explained above, a disc spring having a load-deflection characteristic ($h/t$) of from 1.4 to 1.5 can be designed to a substantially flat spring curve and can be made to exert a substantially constant pressure through a deflection $$\frac{Y-Z}{2}$$

at each side of a dead flat position. The load-deflection curve of the spring assembly will be the same as that of the spring except in magnitude. Thus, in the present example, a load-deflection value of 1.5 was selected for the spring. Using conventional graphs furnished by manufacturers of cone disc springs, it was determined that a disc spring having the selected load-deflection characteristic could be designed to a substantially flat portion of the spring curve by making the total movement equal to 1.2 times $t$.

Values for the inner and outer diameters of the spring were arbitrarily assigned. In the present example these values were 5.555 and 7.000, respectively. Assuming a spring of the foregoing dimensions, the required spring pressure and spring movement were determined from the formula:

$$\frac{L}{A-B}=\frac{X}{Y-Z}=\frac{P_{\text{spring}}}{P_{\text{assembly}}} \text{ or, } \frac{4.375-.825}{3.500-2.777}=\frac{.568}{Y-Z}=\frac{P_{\text{spring}}}{210}$$

Thus, $Y-Z=.113$ inches and $P_{\text{spring}}=1035$ pounds.

It is known that the $$\text{spring pressure}=\frac{1.1\times C\times E\times h/t\times t^4}{R^2}$$

where E is the modulus of elasticity, $t$ the spring thickness, C a constant determined by the ratio of the outer diameter to the inner diameter of the spring, and R is the outer radius of the spring. In the present example, C is 2.842, E is $30\times10^6$, and R is 3.500. Thus, $P_{\text{spring}}$ can be found to equal to $11.5\times10^6\times t^4$. Again, using a standard graph of spring pressure versus thickness, it was found that, for a cone disc spring having a pressure of 1035 pounds, the thickness would be .0975. In the present example, the movement required is .115, the movement begin equal to $1.2\times t$. Since the movement available in the spring having the selected dimensions is $.0975\times1.2$ or .117 inches, it will be seen that a spring having the arbitrarily assigned values for its inner and outer diameters is adequate.

Finally, the stress $S_c$ of the spring in its maximum position of deflection is equal to $$\frac{1.1\times C\times E\times S}{R^2}[C_2(h-S/2)+C+t]$$

where $C_2$ and $C_3$ also are constants determined by the outer and inner diameter ratio of the spring and S is the known permissible working stress. In a spring of the selected dimensions, $C_2=1.033$ and $C_3=1.074$, and, as noted above, $S=240,000$ p.s.i. Therefore $S_c$ has a value of 234,000 p.s.i. which is permissible.

The above procedure of arbitrarily selecting the dimensions of the cone disc spring, calculating the correct relationship between the spring pressure and the thickness, and finally determining the stress in the maximum position of deflection may be followed in constructing a spring disc assembly to suit any particular pulley. It should also be pointed out that the spring disc assemblies can be constructed to exhibit any desired loading characteristic. Thus, while the preferred embodiment of the invention has been disclosed as exhibiting substantially constant pressure over the range of movement of the lever fingers, the spring can be formed to exhibit progressive or regressive loading wherein the spring pressure uniformly increases or decreases through its range of deflection. In each such instance, it is merely necessary to select a value of $h/t$ which will give a load-deflection curve of the desired shape.

It will be apparent from the foregoing that the invention provides a compact, lightweight, easily assembled, spring-loaded variable pitch pulley. As distinguished from the pulley constructions of the prior art, the preferred cone disc spring assembly provides constant loading pressure during face adjustment of the pulley halves, while obtaining the movement required to vary the pitch diameter within maximum limits. It should also be noted that the cone disc spring assembly protects the pulley against dirt and dust. Another advantage afforded by the invention is the provision of a loading mechanism which overcomes the problem of wear encountered with conventional cam-loading mechanisms and the problem of frequent, and often dangerous, spring breakage that is encountered with conventional coil springs.

It will further be apparent from the foregoing that the disc spring assembly of the invention greatly increases the versatility of disc springs, and cone disc springs in particular, since the pressure and deflection ranges of the springs can be adjusted within wide limits to suit the requirements of any particular application. Further, the disc spring assembly is relatively inexpensive and simple to assemble, inasmuch as it utilizes springs formed by conventional means.

Many modifications and variations of the invention will be apparent to those skilled in the art in view of the foregoing detailed disclosure. Therefore, it is to be understood that, within the scope of the appended claims, the invention can be practiced otherwise than as specifically show and described.

What is claimed is:

1. A variable pitch pulley comprising a shaft, a pair of opposed pulley halves on said shaft, at least one of said pulley halves being mounted for axial sliding movement, and spring biasing means for urging said one pulley half toward one end of said shaft, said spring biasing means including a plurality of separate lever fingers having inner fulcrum ends contiguous to said shaft and bearing portions operatively engaging said one pulley half, and a disc spring carried by said lever fingers, said disc spring being movable relative to said fingers so that said spring is free to deflect without distorting said fingers.

2. A variable pitch pulley as claimed in claim 1 wherein said disc spring has a cone-shaped formation and is carried between the bearing portions and fulcrum ends of said fingers.

3. A variable pitch pulley comprising a shaft, a pair of opposed pulley halves mounted on said shaft for axial sliding movement, means connecting said pulley halves for producing equal and opposite movement thereof, and spring biasing means for urging one pulley half toward one end of said shaft whereby the other of said pulley halves is moved toward the opposite end of said shaft, said spring biasing means including a plurality of separate lever fingers having inner fulcrum ends radially disposed around said shaft and outer bearing ends engaging said one pulley half, and a cone disc spring carried by said fingers, said disc spring being movable relative to said fingers so that said spring is free to deflect without distorting said fingers.

4. A variable pitch pulley comprising a shaft, a pair of opposed pulley halves on said shaft, at least one of said pulley halves being mounted for axial sliding movement, and spring biasing means carried on said shaft for urging said one pulley half toward the center of said shaft, said spring biasing means including a plurality of radially extending lever fingers disposed in side-by-side adjacency, each of said fingers having an inner fulcrum end and a bearing portion engaging said one pulley half, and a cone disc spring carried by said fingers between their fulcrum ends and bearing portions, said cone disc spring having a position of repose in which said pulley halves are spaced relatively close together so that movement of said one pulley half away from the center of said shaft will pivot said fingers and cause said cone disc spring to move through its range of deflection, thereby maintaining predetermined loading of said one pulley half.

5. A variable pitch pulley comprising a shaft, a pair of opposed pulley halves on said shaft, at least one pulley half being mounted for axial sliding movement, and spring biasing means for urging said one pulley half toward the center of said shaft, said spring biasing means including a plurality of trianguloid lever fingers in side-by-side adjacency, said fingers having inner fulcrum ends on said shaft and outer bearing ends engaging said one pulley half, and a cone disc spring carried by said fingers; said cone disc spring having a position of repose in which said pulley halves are spaced relatively close together so that movement of said one pulley half away from the center of said shaft will pivot said fingers and cause said cone disc spring to move through its range of deflection, thereby maintaining predetermined loading of said one pulley half.

6. In a variable pitch pulley including a shaft and a pair of opposed pulley halves on said shaft, at least one pulley half being mounted for axial sliding movement for varying the effective pitch diameter of the pulley, the improvement comprising a plurality of lever fingers radially extending from said shaft, said fingers having inner fulcrum ends and outer bearing portions engaging said one pulley half, a cone disc spring which can be deflected in equal amounts at each side of a dead flat position, and means carried by said fingers for connecting said cone disc spring thereto so that said spring is free to move through its range of deflection during pivoting of said fingers, said spring being connected to said fingers so that the spring pressure divided by the effective pressure of said spring assembly equals the distance between the fulcrum end and bearing portion of each pulley finger divided by the spring width.

7. The combination claimed in claim 6 wherein the load-deflection characteristic of said cone disc spring is from approximately 1.4 to 1.5, and wherein the total deflection of said spring is approximately 1.2 times its thickness.

8. A cone disc spring assembly comprising a plurality of radially arranged lever fingers, said fingers having radially inner fulcrum ends and radially outer bearing portions, and a cone disc spring carried by said fingers, said fingers including means forming a relatively movable connection between said cone disc spring and said fingers for permitting said spring to deflect through a dead flat position without distortion of said fingers and without concentrating stresses in the regions where said spring is connected to said fingers.

9. A cone disc spring assembly as claimed in claim 8 wherein said means for connecting said cone disc spring comprises a lip on each finger embracing the radially outer edge of said spring.

10. A cone disc spring assembly as claimed in claim 9 wherein said lips are between the fulcrum ends and bearing portions of said fingers.

11. A cone disc spring assembly comprising a cone disc spring which can be deflected in equal amounts at each side of a dead flat position, a plurality of radially arranged lever fingers, said fingers having corresponding fulcrum ends and corresponding bearing portions, and means carried by said fingers forming a relatively movable connection for said cone disc spring so that said spring is free to move through its range of deflection to pivot said fingers without concentrating stresses in the regions where said spring is connected and without distorting said fingers, said spring being connected to said fingers so that the spring pressure divided by the pressure at said bearing portions equals the distance between the fulcrum end and bearing portion of each finger divided by the spring width.

12. The cone disc spring assembly as claimed in claim 11, wherein said fulcrum ends are the radially inner ends of said fingers.

13. The cone disc spring assembly as claimed in claim 12 wherein said means connecting said cone disc spring comprises a lip on each finger embracing the radially outer edge of said spring.

14. A cone disc spring assembly comprising a cone disc spring having a load deflection characteristic of from approximately 1.4 to 1.5 and a range of deflection of approximately 1.2 times the thickness of said spring, a plurality of radially arranged lever fingers, said fingers having corresponding fulcrum ends and corresponding bearing portions, and means carried by said fingers for connecting said disc spring so that it is free to move through its range of deflection during pivoting of said fingers.

15. A cone disc spring assembly comprising a cone disc spring having a load deflection characteristic of from approximately 1.4 to about 1.5 and a range of deflection of approximately 1.2 times the thickness of said spring, a plurality of radially arranged lever fingers, said fingers having corresponding fulcrum ends and corresponding bearing portions, and means carried by said fingers forming a relatively movable connection for said cone disc spring so that said spring is free to move through its range of deflection to pivot said fingers without concentrating stresses in the regions where said spring is connected and without distorting said fingers, said spring being connected to said fingers so that the spring pressure divided by the pressure at said bearing portions equals the distance between the fulcrum end and bearing portion of each finger divided by the spring width.

References Cited in the file of this patent

UNITED STATES PATENTS

| | | |
|---|---|---|
| 2,289,573 | Almen | July 14, 1942 |
| 2,850,913 | Lewellen et al. | Sept. 9, 1958 |
| 2,952,453 | Haussermann | Sept. 13, 1960 |
| 2,973,655 | Rix | Mar. 7, 1961 |
| 2,983,503 | Haussermann | May 9, 1961 |
| 3,013,792 | Steinlein | Dec. 19, 1961 |
| 3,064,486 | Aplin | Nov. 20, 1962 |